(12) United States Patent
Hamer et al.

(10) Patent No.: US 9,928,594 B2
(45) Date of Patent: Mar. 27, 2018

(54) AUTOMATIC SPATIAL CALIBRATION OF CAMERA NETWORK

(71) Applicant: AGT International GmbH, Zurich (CH)

(72) Inventors: Henning Hamer, Ravensburg (DE); Arsenii Sawchuk, Wiesbaden (DE); Markus Schlattmann, Griesheim (DE); Roel Heremans, Darmstadt (DE)

(73) Assignee: AGT INTERNATIONAL GMBH, Zurich (CH)

( * ) Notice: Subject to any disclaimer, the term of this patent is extended or adjusted under 35 U.S.C. 154(b) by 63 days.

(21) Appl. No.: 14/792,619

(22) Filed: Jul. 7, 2015

(65) Prior Publication Data

US 2016/0012589 A1    Jan. 14, 2016

Related U.S. Application Data

(60) Provisional application No. 62/023,283, filed on Jul. 11, 2014.

(51) Int. Cl.
*G06T 17/05* (2011.01)
*G06T 7/00* (2017.01)
(Continued)

(52) U.S. Cl.
CPC .............. *G06T 7/0018* (2013.01); *G06T 7/80* (2017.01); *G06T 17/05* (2013.01); *G08G 1/04* (2013.01);
(Continued)

(58) Field of Classification Search
None
See application file for complete search history.

(56) References Cited

U.S. PATENT DOCUMENTS 6,295,367 B1    9/2001  Crabtree et al.
2011/0064269 A1  6/2008  Pai M.M et al.
(Continued)

FOREIGN PATENT DOCUMENTS

CN    101727671      5/2012
EP    1744292 A2    1/2007
(Continued)

OTHER PUBLICATIONS

Amol Borkar et al.: "A Non Overlapping Camera Network: Calibration and Application Towards Lane Departure Warning", Jul. 2011.
(Continued)

*Primary Examiner* — Eileen Adams
(74) *Attorney, Agent, or Firm* — Browdy and Neimark, PLLC

(57) ABSTRACT

A method for automatic spatial calibration of a network of cameras along a road includes, processing a frame that is obtained from each camera of the network to automatically identify an image of a pattern of road markings that have a known spatial relationship to one another. The identified images are used to calculate a position of each camera relative to the pattern of road markings that is imaged by that camera. Geographical information is applied to calculate an absolute position of a field of view of each camera. A global optimization is applied to adjust the absolute position of the field of view of each camera of the camera network relative to an absolute position of the fields of view of other cameras of the camera network.

24 Claims, 4 Drawing Sheets

(51) Int. Cl.
G08G 1/04 (2006.01)
H04N 5/247 (2006.01)
H04N 7/18 (2006.01)
G06T 7/80 (2017.01)

(52) U.S. Cl.
CPC ............ *H04N 5/247* (2013.01); *H04N 7/181* (2013.01); *G06T 2200/21* (2013.01); *G06T 2207/10004* (2013.01); *G06T 2207/20008* (2013.01); *G06T 2207/30232* (2013.01); *G06T 2207/30241* (2013.01); *G06T 2207/30244* (2013.01); *G06T 2207/30256* (2013.01); *G06T 2210/61* (2013.01)

(56) References Cited

U.S. PATENT DOCUMENTS

| | | | |
|---|---|---|---|
| 2010/0318291 A1* | 12/2010 | Gluck | G01C 21/367 701/532 |
| 2013/0336583 A1 | 12/2013 | Ernst et al. | |
| 2014/0036087 A1* | 2/2014 | Furue | G11B 27/034 348/157 |
| 2014/0169633 A1* | 6/2014 | Seyfried | G06K 9/00791 382/105 |
| 2014/0250457 A1* | 9/2014 | Ramaswamy | H04N 21/812 725/34 |
| 2014/0257942 A1* | 9/2014 | Nerayoff | H04N 7/181 705/13 |
| 2015/0254443 A1* | 9/2015 | Blessing | G06F 21/32 726/7 |

FOREIGN PATENT DOCUMENTS

| | | |
|---|---|---|
| GB | 2482127 | 1/2012 |
| WO | WO 2007/094802 | 8/2007 |
| WO | WO 2014/013012 | 1/2014 |
| WO | WO 2014/067935 | 5/2014 |

OTHER PUBLICATIONS

Barron J L et al.: "Systems and Experiment performance of Optical flow technique", International Journal of Computer Vision. Kluwer Academic Publishers, Norwell, US, vol. 12, No. 1, Jan. 1, 1994, pp. 43-77, XP001109171, ISSN: 0920-5691, DOI: 10.1007/BF0140984.

Burt P J et al.: "Object tracking with a moving camera" Visual Motion, 1989, Proceedings. Workshop on Irvine, CA, USA Mar. 20-22, 1989, Washington, DC, USA, IEEE Comput. Soc. PR, XP010014669. DOI: 10.1109/WVN.1989.47088. ISBN: 978-0-8186-1903-8.

Chen and Leung: "Multi-Camera Tracking by Joint Calibration, Association and Fusion", Department of Electrical and Computer Engineering University of Calgary. Calgary, Alberta, Canada, 2011, IEEE.

European Search Report from EP12176857 dated Dec. 18, 2012.
European Search Report from EP2725552 dated Mar. 5, 2013.

Hu W et al.: "A Survey on Visual Surveillance of Object Motion and Behaviors", IEEE Transactions on Systems, MAN and Cybernetics: Part C: Applications and Reviews, IEEE Service Center, Piscataway, NJ, US, vol. 34, No. 3, Aug. 1, 2004, pp. 334-352, XP011114887, ISSN: 1094-6977, DOI: 10.1109/TSMCC.2004.829274.

International Search Report together with Written Opinion from PCT/EP2013/065174 dated Dec. 12, 2013.

International Search Report together with Written Opinion from PCT/EP2013/072590 dated Jan. 21, 2014.

Kanhere and Birchfield: "A Taxonomy and Analysis of Camera Calibration Methods for Traffic Monitoring Applications", Intelligent Transportation Systems, IEEE vol. 11 Issue 2, pp. 441-452, ISSN: 1524-9050, Jun. 2010.

Marta Wilczkowiak et al.: "Camera Calibration and 3D Reconstruction from Single Images Using Parallelepipeds", inria-00525657, version 1—May 26, 2011.

Svoboda et al.: "A Convenient Multi-Camera Self-Calibration for Virtual Environments", Computer Vision Lab Department of Information Technology and Electrical Engineering Swiss Federal Institute of Technology and Centre for Machine Perception Department of Cybernetics, Czech Technical University in Prague. Revised version: Jun. 16, 2004.

Yao-Te Tsai et al.: "Multiple Human Objects Tracking in crowded Scene", 18th International Conference on Pattern Recognation (ICPR '06), vol. 3, Jan. 1, 2006, pp. 51-54, XP055046751, DOI: 10.1109/ICPR.2006.841, ISBN: 978-0-76-952521-1.

Yilmaz Alper et al.: "Object Tracking: A Survey", ACM Computing Surveys, ACM, New York, NY, US, vol. 38, No. 4, Dec. 1, 2006, pp. 1-45, XP007902942. ISSN: 0360-0300.

* cited by examiner

AUTOMATIC SPATIAL CALIBRATION OF CAMERA NETWORK

CROSS REFERENCE TO RELATED APPLICATIONS

The present invention claims the priority benefit of U.S. provisional patent application No. 62/023,283 filed on Jul. 11, 2014, which is incorporated in its entirety herein by reference.

FIELD OF THE INVENTION

The present invention relates to camera calibration. More particularly, the present invention relates to spatial calibration of a camera network.

BACKGROUND OF THE INVENTION

Surveillance cameras are often positioned along roads to monitor traffic on the road. The cameras may serve the purpose of deterring or detecting traffic violations or criminal activity along the road. The cameras may detect road conditions or traffic conditions that require attention from appropriate government, road maintenance, or law enforcement authorities. Images that are acquired by the cameras may be monitored by human observers, may be subjected to automatic analysis by an computer or processor, or both.

Placement of a network of cameras along a road may increase visual coverage of the road and increase the likelihood of detecting a problem. For example, cameras of the network may have adjoining, or partially overlapping, fields of view, or may have gaps between the fields of view of neighboring cameras. The gaps may be sufficiently small (e.g., no longer than about 5 meters) such that the road does not significantly change direction between one camera and the next.

SUMMARY OF THE INVENTION

There is thus provided, in accordance with some embodiments of the present invention, a method for automatic spatial calibration of a network of cameras along a road, the method including: for each camera of the network, processing a frame that is obtained from each camera of the network to automatically identify an image of a pattern of road markings that have a known spatial relationship to one another; using the identified images to calculate a position of each camera relative to the pattern of road markings that is imaged by that camera; applying geographical information to calculate an absolute position of a field of view of each camera; and applying a global optimization to adjust the absolute position of the field of view of each camera of the camera network relative to an absolute position of the fields of view of other cameras of the camera network.

Furthermore, in accordance with some embodiments of the present invention, identifying the markings includes applying a Hough transform, a scale invariant feature transform (SIFT), or a speeded up robust features (SURF) detection to the frame.

Furthermore, in accordance with some embodiments of the present invention, the road markings include broken line lane separation markings.

Furthermore, in accordance with some embodiments of the present invention, the pattern of road markings is two dimensional.

Furthermore, in accordance with some embodiments of the present invention, using the identified images includes using a measured position of the identified images within the frame to calculate the position of the camera relative to the pattern.

Furthermore, in accordance with some embodiments of the present invention, the geographical information includes a known geographical position of the camera.

Furthermore, in accordance with some embodiments of the present invention, the geographical information includes a known geographical position of the road or of the pattern.

Furthermore, in accordance with some embodiments of the present invention, the absolute position of a field of view is defined relative to a global coordinate system.

Furthermore, in accordance with some embodiments of the present invention, applying the global optimization includes minimizing a value of a function that is indicative of a misalignment of the field of view of a camera of the camera network relative to the fields of view of the other cameras of the camera network Furthermore, in accordance with some embodiments of the present invention, applying the global optimization includes applying a rotation, translation, size adjustment, or shape modification to an absolute position of a field of view of a camera of the camera network.

Furthermore, in accordance with some embodiments of the present invention, the rotation, translation, or size adjustment is configured to align a projection into a horizontal plane of a marking image in the frame that is acquired by one of the cameras with a projection into the horizontal plane of a marking image in the frame that is acquired by a camera of the other cameras.

Furthermore, in accordance with some embodiments of the present invention, the frame that is obtained from a camera of the camera network is obtained by application of background learning to a plurality of frames that are acquired by that camera.

There is further provided, in accordance with some embodiments of the present invention, a camera network system including: a plurality of cameras that are positioned at different places along a road, the road including at least one pattern of road markings; and a processing unit in communication with a computer readable medium, wherein the computer readable medium contains a set of instructions wherein the processing unit is designed to carry out the set of instructions to: obtain a frame from each camera of the plurality of cameras; identify in each obtained frame an image of a pattern of the at least one pattern; calculate a position of each camera relative to the pattern of the at least one pattern; apply geographical information to calculate an absolute position of a field of view of each camera: and apply the global optimization comprise instructions to rotate a field of view of a camera of the plurality of cameras.

Furthermore, in accordance with some embodiments of the present invention, the at least one pattern of road markings includes at least two broken line lane separation markings.

Furthermore, in accordance with some embodiments of the present invention, a pattern of the at least one pattern of road markings is two dimensional.

Furthermore, in accordance with some embodiments of the present invention, a geographic position of a camera of the plurality of cameras is known.

Furthermore, in accordance with some embodiments of the present invention, a camera of the plurality of cameras is substantially stationary.

Furthermore, in accordance with some embodiments of the present invention, the instructions to apply the global optimization include instructions to minimize a value of a function that is indicative of a misalignment of the field of view of a camera of the plurality of cameras relative to the fields of view of the other cameras of the plurality of cameras.

Furthermore, in accordance with some embodiments of the present invention, the instructions to apply the global optimization include instructions to rotate, translate, adjust a size, or modify a shape of an absolute position of a field of view of a camera of the plurality of cameras.

Furthermore, in accordance with some embodiments of the present invention, the absolute position of a field of view is defined relative to a global coordinate system.

There is further provided, in accordance with some embodiments of the present invention, non-transitory computer readable storage medium having stored thereon instructions that when executed by a processor will cause the processor to perform the method of: obtaining a frame from each camera of a network of cameras that are arranged along a road; identifying an image of a pattern of road markings in each obtained frame; calculating a position of each camera of the network relative to the pattern corresponding to the image in the frame that was obtained from that camera; applying geographical information to calculate an absolute position of a field of view of each camera of the network; and adjusting the absolute position of the field of view of a camera of the network in relative to the absolute position of the field of view of another camera of the network.

BRIEF DESCRIPTION OF THE DRAWINGS

In order to better understand the present invention, and appreciate its practical applications, the following Figures are provided and referenced hereafter. It should be noted that the Figures are given as examples only and in no way limit the scope of the invention. Like components are denoted by like reference numerals.

DETAILED DESCRIPTION OF THE INVENTION

Figure 1:
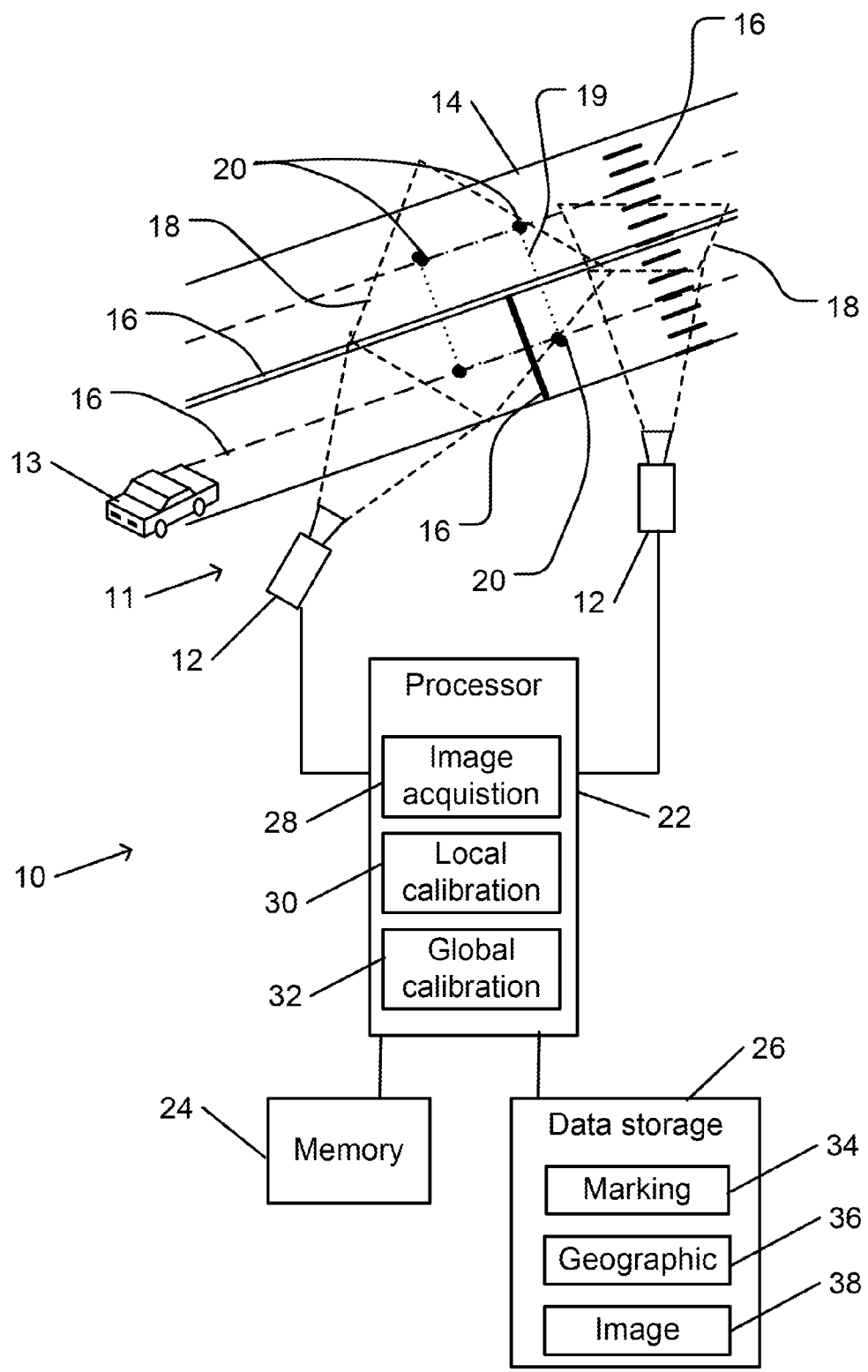
FIG. 1 is a schematic illustration of a system for automatic spatial calibration of a camera network, in accordance with an embodiment of the present invention.

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, us of the conjunction "or" as used herein is to be understood as inclusive (any or all of the stated options).

Embodiments of the invention may include an article such as a computer or processor readable medium, or a computer or processor non-transitory storage medium, such as for example a memory, a disk drive, or a USB flash memory, encoding, including or storing instructions, e.g., computer-executable instructions, which when executed by a processor or controller, carry out methods disclosed herein.

In accordance with an embodiment of the present invention, a network of substantially stationary cameras that are positioned along a road or roadway may be spatially calibrated. The spatial calibration includes imaging a pattern of road markings having a known spatial relationship and analyzing the image to determine a position of the camera relative to the markings. A known geographic position of the camera (e.g., of a pole, post, or mast on which the camera is mounted) or of the markings may be utilized to determine an position and orientation of the camera, and thus a relation of a field of view of the camera relative to the field of view of another camera of the network.

A substantially stationary camera may also refer to a mobile camera whose geographic position is known. For example, the substantially stationary camera may be mounted on a drone whose Global Positioning System (GPS) position is known.

Spatial calibration as used herein may include what is commonly called extrinsic calibration or calibration of extrinsic parameters. For example, a single image of a calibration pattern may be used to calculate the extrinsic calibration (e.g., three translation parameters and three rotation parameters) of the camera. Spatial calibration may include intrinsic calibration of an intrinsic parameter (e.g. the focal length, e.g., in a camera with a zoom lens or otherwise variable or unknown focal length).

Spatial calibration refers to a determination of a position of the field of view of each camera of the camera network. As referred to herein, a position of the field of view refers to a position of the field as projected on a predetermined two- or three-dimensional surface. The position of the field of view may be defined as a displacement and orientation of the projection of the field of view with respect to a known coordinate system (e.g., GPS coordinates, as determined by a displacement and orientation of the camera). The position of the field of view may include a size of the projection of the field of view (e.g., having a standard or known shape, and determined by the camera focal length and by the position of the camera relative to the predetermined surface). The position of the field of view may include boundaries of the projected field of view. For example, the predetermined surface may include a local or regional ground plane, or another relevant surface (e.g., a sloped or curved surface, e.g., in a hilly region). The position of the field of view may be parameterized by the extrinsic (e.g., relative to a global or regional coordinate system) and intrinsic camera parameters.

The spatial calibration may thus enable determination of a position of an imaged object relative to the projected field of view, and thus relative to the known coordinate system. For example, when the imaged object is close to the predetermined surface (e.g., the objects is supported by the surface, such as a vehicle travelling on the road), the determined position of the object is substantially identical to its actual position. (When the object is not near the surface, e.g., is flying or is otherwise elevated above the predetermined surface, in the absence of independent information related to the object's height, the determined position is the object's position as projected onto the predetermined surface.)

The spatial calibration may determine a position of the camera relative to one or more landmarks. As used herein, a position of the camera relative to the landmark may refer to either or both of a displacement or an orientation. A landmark may refer to an object (e.g., a camera mast or other object) at a fixed geographic position or to a point with known coordinates (e.g., an origin of other point of a global latitude and longitude system, or of another local or global coordinate system with a defined origin). As used herein, spatial calibration of a camera network refers to spatial calibration of the cameras of the camera network in such a manner that a spatial relationship (e.g., relative position or orientation) of one camera to other cameras of the network is determined.

The spatial calibration may be utilized in accurately identifying a geographic position of an imaged object or event. The spatial calibration may be utilized in correctly adjusting parameters of the camera such a focal length or depth of field. The spatial calibration may be utilized when following a moving object, such as a vehicle, pedestrian, animal, or other moving object, as the object moves from the field of view of one camera of the network to the field of view of the other.

Reference herein to a road or roadway should be understood as referring to any area that includes markings that are placed with a known spatial pattern or relation. For example, a road may refer to a segment of a road, a grid or pattern of roads, parking lot, park, playground, schoolyard, pedestrian sidewalk or walkway, bicycle path, sports arena or stadium, racetrack, airport runway or taxiway, railroad tracks or yard, bus or train station, shopping mall, shipping canal, or other area that is marked in a known manner. The road may be straight or rectangular, or curved or rounded. Any such area is herein referred to as a road.

The road markings may include geometric objects or patterns that are painted onto or otherwise placed in a fixed manner on the road surface. The road markings may include fixed objects that extend (e.g., vertically) out of the road surface (e.g., lampposts, curbs, distance markers, lane barriers, signs, or other objects that are placed in a known pattern or at known positions on the road or next to the road).

Each camera of the network is configured to acquire images of a part of the road in the form of an image frame. As used herein, a frame may refer to an acquired video frame or to a singly acquired image or photograph.

A frame as referred to herein (except in the context of acquisition by the camera) may also be obtained may construction of a composite image by processing of a plurality of video frames or still images that are each acquired by a camera. For example, a plurality of acquired images may be processed by application of background learning to separate a fixed background (e.g., the road or road markings) from moving objects (e.g., vehicles, pedestrians, animals, windborne objects, swaying branches or other swaying objects, or other moving objects) that may obstruct part or all of the background in some of the acquired images. The image frames may be acquired or obtained continuously, at predetermined times, or in response to an event. For example, video frames may be acquired continuously, at predetermined times, or in response to an event (e.g., as sensed by a sensor or as a result of an action by a human operator). Still frames may be acquired continuously, periodically, or in response to an event. A frame may be obtained by application of background learning when a sufficient number of frames are acquired to enable construction of a sufficiently complete background image to enable calibration (e.g., includes a pattern of road markings).

Each camera is characterized by a field of view that is imaged when acquiring the frames. The field of view may be determined by a position of the camera, and by one or more characteristics of the camera. The characteristics may include a focal length or other property of the camera lens or focusing optics, an effective size of an image sensor (e.g., size of the sensor, area over which the sensor is scanned), size or position of one or more apertures, or other characteristics. The field of view of a camera of the network may include part of the road. The fields of view of successive or adjacent cameras of the network may overlap, such that the entire length of the road is imaged by one or another of the cameras. Fields of view of successive cameras of the network may be separated from one another, such that there are segments of the road that are not imaged by any of the cameras.

Acquired frames may be stored, processed, or manipulated in a digital format that represents the image content of the acquired frame.

A road may include markings that have a known spatial relationship with one another. Such known spatial relationships may be determined by local or national standards for road construction or marking, or may be determined from design specifications or other records regarding the road. For example, a road may include lane separation markings in the form of solid or broken lines that are separated from one another by a known distance. Line segments of a broken line lane separation marking may be of known length and separation. Line segments of different broken line lane separation markings on a single road may be approximately aligned with one another. Crosswalk, stop lines, parking space indications, or other markings may have known dimensions.

Each camera of the network may acquire a frame that includes images of the markings. One or more image processing techniques may be applied to the frame to automatically identify images of the road markings. For example, a Hough transform or other image analysis technique may be applied to the frame to detect the presence of an imaged marking in the form of a line or of another known structure or form.

The identified marking images may be analyzed to determine a position of the camera relative to the markings. For example, the two-dimensional relationships among the marking images may be compared with a known two- or three-dimensional structure of the markings. Analysis of the comparison may yield a transformation from the structure of the markings to the marking images (e.g., the marking as projected into the image plane). The transformation may be analyzed in light of known (intrinsic) parameters of the camera (e.g., related to magnification or other parameters) to yield a position of the camera relative to the markings, or the parameters may be derived as part of the calibration. The analysis may include calculation of a translation, rotation, or distance, or of a vanishing point.

A relative position may be converted to an absolute position, e.g., in a global or regional coordinate system. The absolute position may be calculated on the basis of a known geographic position of one or more features of the road or camera (e.g., a camera mast, an orientation of a straight road, of an imaged marking, or of another feature). Alternatively or in addition, a technique may be applied to de-skew images by different cameras to align images that are acquired by different cameras. For example, an applied de-skewing technique may include inverse perspective mapping. De-skewing may be performed based on a known camera position by applying a ground plane assumption. For example, the camera may be assumed to be aimed at a horizontal plane (or other plane of known slope) from a known height (e.g., 8 meters or another height). On the basis of this assumption, the image may be projected to a three-dimensional space.

Automatic calibration of a camera network, in accordance with an embodiment of the present invention, may be performed periodically or otherwise at predetermined times, in response to a predetermined event (e.g., change in field of view indicative of a change in orientation, or other event), as requested by a user such as a supervisor or operator of the camera network, or whenever conditions permit (e.g., when illumination or weather conditions permit a clear view of road markings, absence of heavy traffic that blocks a view of the road markings, or other conditions). (In some cases, the presence of traffic may traffic may not impede automatic calibration of the camera network. Techniques to automatically distinguish the background from moving objects may be applied to utilize sequential images of the markings when the entire marking is not visible in a single image.)

In some cases, markings whose images are to be used in automatic calibration of the camera network may be initially identified by a human operator, e.g., at the time of installation of a system for automatic camera network calibration. For example, installation may be concurrent with installation of the camera network itself, or may take place during servicing or upgrading of a system for operation of the camera network. During subsequent automatic calibration, images of those markings that were identified by the human operator may be automatically identified by the operation system. In other cases, marking may be automatically identified by a processor of the operation system without need for human intervention or initiation, e.g., with reference to a library of road markings.

Automatic calibration of cameras of a camera network, in accordance with an embodiment of the present invention, may be advantageous over other camera calibration methods. Since automatic calibration does not require any personnel to be physically present at the site of the camera or on the monitored road, automatic calibration may be performed or repeated frequently without disruption to traffic on the road or to monitoring of the traffic.

For example, some other camera calibration techniques would require a field team to identified or physically mark (e.g., with a laser or otherwise) one or more objects in the field of view of each camera of the network. The field team would also be required to measure and provide locations of the marked objects. Such a technique would be tedious and labor intensive, and could be disruptive to traffic on the monitored road. Since cameras may move over time, the process would have to be repeated at times for all of the cameras, or the offset relative to a reference image would have to be calculated (which may introduce errors).

FIG. 1 is a schematic illustration of a system for automatic calibration of a camera network, in accordance with an embodiment of the present invention.

Camera network system 10 is configured for automatic calibration of camera network 11. Camera network 11 includes a plurality of cameras 12. Each camera 12 is configured to acquire images of a segment of road 14. For example, each camera 12 may be configured to acquire image frames in the form of video, series of successively acquired still images, or both. An image frame may be acquired in the form of a digital representation of the contents of the image frame.

Camera network system 10 may be configured to automatically monitor movement of an object 13 (e.g., a vehicle, pedestrian, or other moving object) along road 14.

Road 14 includes a pattern of road markings 16. For example, road markings 16 may include solid, double, or broken lines for demarcation of lanes. Road markings 16 may include markings for guiding or directing traffic (e.g., stop lines, arrows, crosswalk markings, parking space markings, indications of no parking zones, other markings related to operation of vehicles). Road markings 16 may include other permanent objects or features that have a known spatial arrangement relative to one another (e.g., parking meters, lampposts, trees, barriers, fences, manhole covers, sewer grates, bridges, or other objects). Road markings 16 may be located on a pavement of the road, on a curb, sidewalk, driveway, or on another region that is on or adjacent to the road.

One or more of road markings 16 may be selected for use in automatic calibration of camera network 11. The selected road markings 16 may be selected (e.g., initially) by a human operator, or may be selected automatically (e.g., at the time of calibration).

Each camera 12 may be characterized by a field of view 18. When operated to monitor road 14, the field of view 18 of each camera 12 may be oriented so as to include part of road 14. The field of view 18 may include one or more road markings 16. Thus, an image frame that is acquired by that camera 12 may include an image of an included road marking 16.

For example, a field of view 18 of a camera 12 may include marking pattern 19. Marking pattern 19 may include portions of one or more road markings 16 that are arranged two-dimensionally, and non-linearly or non-collinearly. For example, marking pattern 19 may be defined by three or more marking points 20. For example, marking points 20 may correspond to an end of an arc or line segment of a road marking 16 (e.g., end of a segment of a broken line, stop line, crosswalk marking, parking space marking, termination of a solid line, or other segment), or a point of meeting or intersection between two segments of one or more road markings 16, of two road markings 16, or of a segment of a road marking 16 with another road marking 16.

In some cases, marking pattern 19 may be two- or three-dimensional, e.g., where one of the dimensions extends out of the road surface (e.g., vertically or perpendicularly). For example, road marking 16 may include a marking that is above the surface of road 14, e.g., a marking on a vertical post.

Processor 22 of camera network system 10 may communicate with cameras 12 of camera network 11. Processor 22 may include one or more processing units, e.g. of one or more computers. Processor 22 may be configured to operate in accordance with programmed instructions stored in memory 24. Processor 22 may be capable of executing an application for automatic calibration of camera network 11.

In some cases, processor 22 may communicate with one or more other sensors. For example, other sensors may be mounted together with one or more of cameras 12, may be mounted on road 14, may be brought to the scene by an operator or maintenance Technion, or may be placed elsewhere. The sensors may provide information that may indicate a need to perform automatic calibration, or may assist in calibration. For example, sensors may sense conditions that may indicate a need to perform automatic calibration. Such conditions may include, for example, a change in weather conditions (e.g., as indicated by a meteorological sensor), a mechanical shock to a camera 12 (e.g., as indicated by an accelerometer or orientation sensor), or another condition. Sensors may provide information that may assist in automatic calibration. Such information may include location information (e.g., a Global Positioning System receiver or surveying equipment) or orientation information (e.g., from a compass, level, gyroscope, or other orientation sensor).

Processor 22 may communicate with memory 24. Memory 24 may include one or more volatile or nonvolatile memory devices. Memory 24 may be utilized to store, for example, programmed instructions for operation of processor 22, data or parameters for use by processor 22 during operation, or results of operation of processor 22

Processor 22 may communicate with data storage device 26. Data storage device 26 may include one or more fixed or removable nonvolatile data storage devices. For example, data storage device 26 may include a computer readable medium for storing program instructions for operation of processor 22. The programmed instructions may include image acquisition module 28 for controlling image acquisition by cameras 12. The programmed instructions may include local calibration module 30 for performing local calibration of each camera 12. The programmed instructions may include global calibration module 32 for performing global calibration of cameras 12 of camera network 13.

Data storage device 26 may be remote from processor 22. In such cases data storage device 26 may be a storage device of a remote server storing module image acquisition module 28, local calibration module 30, or global calibration module 32 in the form of an installation package or packages that can be downloaded and installed for execution by processor 22.

Data storage device 26 may be utilized to store data or parameters for use by processor 22 during operation, or results of operation of processor 22. In particular, data storage device 26 may be utilized to store one or more of marking library 34, geographic library 36, and image data 38. For example, marking library 34 may include information regarding one or more types of markings 16. The information may include information regarding spatial relationships (e.g., relative or absolute sizes, spacing, angles, or other relationships) among segments of markings 16. Geographic library 36 may include information regarding geographic placement of road 14 or of markings 16. The information may relate to a shape (e.g., curved or straight), direction, or location of road 14 or of a marking 16. One or both of marking library 34 or geographic library 16 may include remote resources that are accessible via a network, such as the Internet. For example, geographic library 16 may include an online map resource.

Data related to acquired frames, or identified marking images or identified points of a marking image within a frame, may be stored as image data 38. For example, image data 38 may relate to a data that is required to perform automatic calibration of camera network 11, or calibration data or another result of performance of the automatic calibration.

Processor 22 may be operated to execute a method for calibration of camera network system 10.

Figure 2:
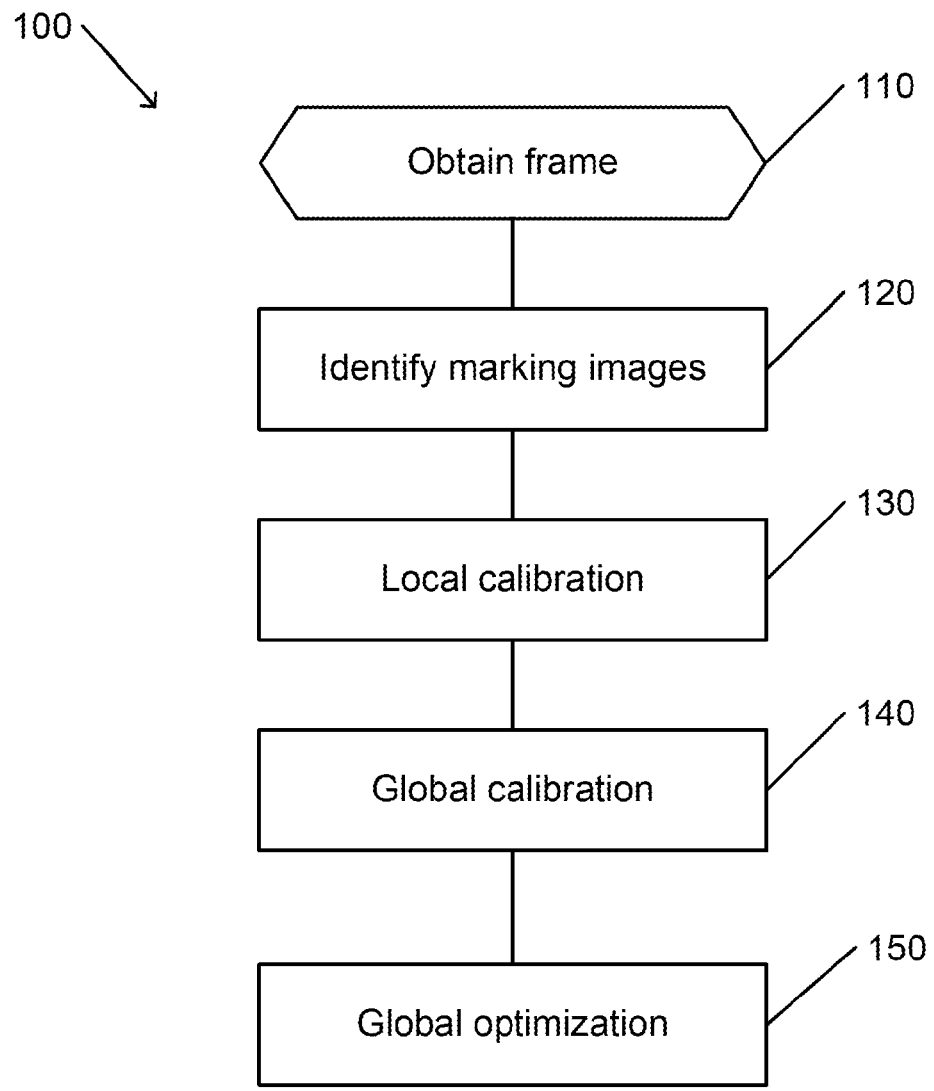
FIG. 2 is a flowchart depicting a method for automatic spatial calibration of a camera network, in accordance with an embodiment of the present invention.

FIG. 2 is a flowchart depicting a method for automatic spatial calibration of a camera network, in accordance with an embodiment of the present invention. Reference is also made to FIGS. 3A-3D, which schematically illustrate application of the method for automatic spatial calibration of the camera network.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Automatic camera network calibration method 100 may be executed by a processor of a camera network system. Execution of automatic camera network calibration method 100 may be initiated automatically at predetermined times or intervals (e.g., at times when traffic on a monitored road is known or expected to be sparse, or at other predetermined times or intervals). Execution of automatic camera network calibration method 100 may be initiated automatically upon detection of an event (e.g., a sensed or detected movement of the camera, or detection of a mechanical stress or shock). Execution of automatic camera network calibration method 100 may be initiated by an operator of the camera network system.

Execution of automatic camera network calibration method 100 utilizes an obtained image frame (block 110). The image frame is expected to include an image of the road. The image frame may be acquired by a camera, or may be created on the basis of a plurality of acquired image frames (e.g., by applying a background learning technique to create an image of a background without the presence of transient images of moving objects).

An image of a road marking may be identified in the acquired frame (block 120). One or more image or shape detection techniques may be applied to the acquired frame in order to identify an image that corresponds to one or more known types of road markings. For example, a Hough transform, a scale invariant feature transform (SIFT), or speeded up robust features (SURF) detection may be applied to detect features such as lines or other features in the image. Identification of the image of the road markings may include an arrangement of road markings. For example, an image of a rectangular arrangement of segments of two parallel broken-line lane markers may be identified. As another example, a Harris corner detector may be applied. Detected interest points may be grouped to form segments or dashes of a broken line lane marker. A brightness threshold may be applied to distinguish road markings from the pavement. Filtering may be applied to find a particular form (e.g., a segment of broken line lane marker) among the shapes (e.g., blob-like) that result from application of the brightness filter.

The road markings may be identified with reference to a marking library, or elsewhere. For example, a pattern of identified lines, line segments, arrows, curves, or other shapes, may correspond to a known type of road marking.

Figure 3A:
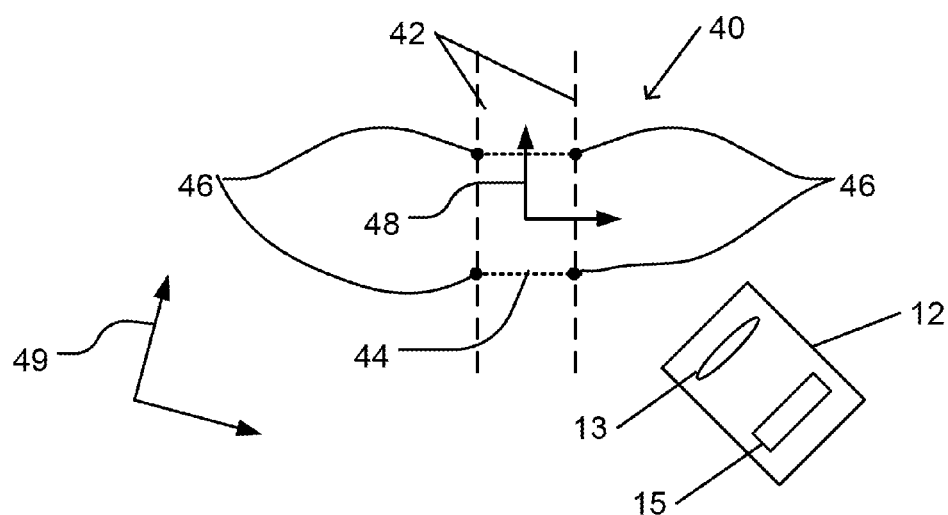
FIG. 3A schematically illustrates an aerial view of a road for utilization in automatic spatial calibration of a camera network, in accordance with an embodiment of the present invention.

FIG. 3A schematically illustrates an aerial view of a road for utilization in automatic spatial calibration of a camera network, in accordance with an embodiment of the present invention.

Road 40 includes road markings 42, part of which form road marking pattern 44. In the example shown, road markings 42 include two parallel straight broken lines, segments of which form a rectangular road marking pattern 44. Other types of road markings and arrangements of road markings may be present and may be utilized. Road marking pattern 44 may be defined by pattern points 46.

Coordinates of pattern points 46 may be defined in a local coordinate system 48. For example, an origin and axes of local coordinate system 48 may be defined relative to pattern points 46. Thus, local coordinate system 48 may be defined arbitrarily without any need to know a location or orientation of pattern points 46 relative to any other landmark or coordinate system.

Absolute coordinates of pattern points 46 may be defined in a global coordinate system 49. For example, global coordinate system 49 may correspond to a regional coordinate system (e.g., as defined for a municipality, district, county, country, or other region), or to a worldwide coordinate system such as latitude and longitude or Global Positioning System (GPS) coordinates. Coordinates of road 40, of road markings 42, or road marking pattern 44, or of pattern points 46 relative to global coordinate system 49 may be determined by reference to a geographic library, or other source of geographic information.

Prior to execution of automatic camera network calibration method 100, the position (e.g., displacement or orientation) of a camera 12 relative to local coordinate system 48 or to global coordinate system 49 may not be known.

Figure 3B:
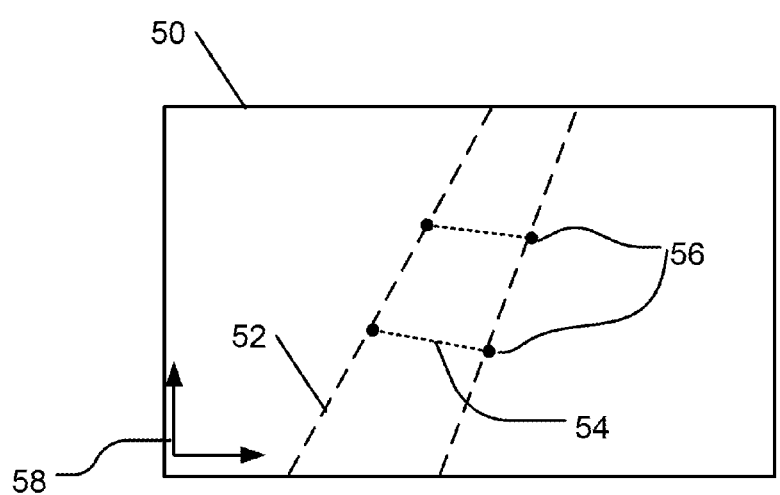
FIG. 3B schematically illustrates an image frame that includes an image of a part of the road shown in FIG. 3A.

FIG. 3B schematically illustrates an image frame that includes an image of a part of the road shown in FIG. 3A.

Image frame 50 may be acquired by a camera 12 whose field of view includes road 40. Analysis of image frame 50 may identify marking images 52, marking pattern image 54, or both. For example, marking images 52 or marking pattern image 54 may be recognized or identified by their correspondence to road markings 42 or road marking pattern 44. The form of marking image 52 or marking pattern image 54 in image frame 50 may be determined, at least in pan, by projection of the corresponding road marking 42 or road marking pattern 44 onto camera image plane 15 via camera optics 13.

Image points 56 in image frame 50 may correspond to pattern points 46 on road 40. Coordinates of image points 56 of marking pattern image 54 may be measured relative to frame coordinate system 58. For example, coordinates in frame coordinate system 58 may correspond to pixel row and column numbers, or to another coordinate system that is applicable to an image frame. For example, the pixel rows and columns may correspond to pixel or other coordinates on detector array that is located at camera image plane 15.

In some cases, images of the road markings may be not be identifiable in the acquired frame. For example, one or more road markings may be obscured by vehicular or pedestrian traffic, or by snow, fog, or other conditions. In such a case, continued execution of automatic camera network calibration method 100 may be suspended until a suitable image frame is acquired. In some cases, one or more image processing techniques may be applied to enable identification of an image of a road marking.

The identified marking images are analyzed with reference to a known spatial relationship among the imaged road markings to perform local calibration of each camera of the camera network (block 130). Local calibration may include calculation of a position (e.g., one or more of displacement, orientation, distance, or other position-related quantity) of camera 12 relative to local coordinate system 48. The calculation may include applying one or more back-projection techniques to image points 56. The calculation may determine a position of camera 12 (or of image plane 15 of camera 12) relative to the corresponding pattern points 46 on road 40 that results in the measured positions of image points 56. The calculation may be based on any known features of camera optics 13 (e.g., effective focal length, aperture openings, or other parameters). As another example, a vanishing point calculation based on marking images 52 may yield a position of camera 12 relative to local coordinate system 48.

Knowledge of position-related information regarding camera 12 may be utilized to simplify or to increase the accuracy of the calculation. For example, a distance of camera 12 from road marking 42 may be known, or an orientation of camera 12 may be known (e.g., from a compass or tilt sensor).

Geographical information may be applied to perform a global calibration of each camera of the camera network (block 140). The global calibration may calculate a position of a camera 12 with respect to global coordinate system 49.

A known geographic position (e.g., GPS coordinates) of camera 12 or of one or more of road 40, road marking 42, road marking pattern 44, or arrangement point 46 may be known. For example, an orientation of road 40 may be known from a map or other reference. The geographical knowledge may be utilized to determine an absolute position (e.g., displacement or orientation) of the origin and axes of local coordinate system 48 in global coordinate system 49.

In this manner, a geographical location or absolute position of the field of view of camera 12 may be determined. The spatial calibration of a camera may include the delineation of the field of view of each camera 12 of the camera network, or an equivalent designation of a portion of road 40 that is being monitored by each camera 12.

A global optimization may be performed (block 150).

For example, a global optimization to correct the spatial calibration may be applied to prevent misregistration or misalignment of imaged markings or objects that are imaged two cameras of the camera network. For example, global optimization may be applied to ensure that application of the spatial calibrations to two cameras whose fields of view overlap results in a single position or orientation of the imaged marking or object.

Mis-registration or misalignment may result from accuracy limitations of a calculation of a local of global calibration (e.g., caused by a near-parallel projection or other limitation), a limited accuracy of provided geographical information, misregistration of road markings (e.g., broken lines of two lane division markers being out of phase with one another), distortion (e.g., by the camera or the atmosphere), or other causes.

Global optimization may adjust an absolute position of a field of view resulting from application of global calibration in accordance with the absolute positions of the fields of view of other cameras (e.g., some or all) of the camera network. The adjustment may include rotation, translation, size adjustment (e.g., as related to an adjustment of focal length), or a modification of the projected shape (e.g., effected by an adjustment of camera parameters).

For example, the calibration may be applied to image frames, such as image frame 50, to calculate a position and orientation of a feature of the image, such as marking image 52, with respect of global coordinate system 49. This process may be considered as equivalent to de-skewing image frame 50, or to re-projecting image frame 50 into a (absolutely) horizontal plane. For example, inverse perspective mapping may be applied to de-skew the image frames.

Figure 3C:
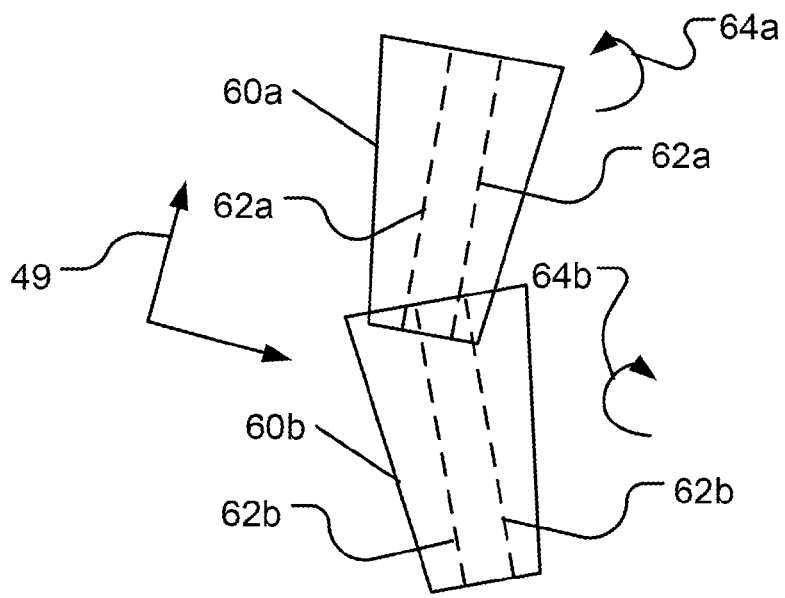
FIG. 3C schematically illustrates image frames, such as the image frame shown in FIG. 3B, as projected into a horizontal plane.

FIG. 3C schematically illustrates image frames, such as the image frame shown in FIG. 3B, as projected into a horizontal plane.

Projected fields of view 60a and 60b of two different cameras of the camera network are shown as projected onto a surface at points in global coordinate system 49 that are indicated by the global calibration. In some cases, projected fields of view 60a and 60b may be coplanar. Projected markings 62a and 62b correspond to projections of marking images, such as marking image 50, onto the plane of projected fields of view 60 and 60b, respectively. Local calibration of each camera may ensure that projected markings 62a are parallel to one another, and that projected markings 62b are parallel to one another. However, projected markings 62a are misaligned with respect to projected markings 62b. Markings 62a and 62b may be considered (e.g., on the basis of geographical information) to correspond to different parts of a single set of linear road markings 42. Therefore, the misalignment may be indicative of a need to correct the alignment.

Global optimization may align projected fields of view 60a and 60b, e.g., by application of a rotation to one or both. For example, rotation 64a may be applied to projected field of view 60a, and rotation 64b may be applied to projected field of view 60b. The rotation may be incorporated into a globally optimized spatial calibration.

Figure 3D:
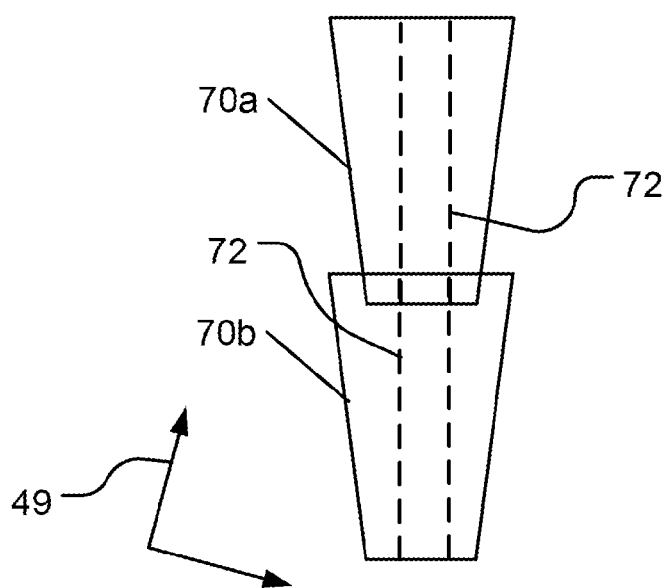
FIG. 3D schematically illustrates the projected image frames of FIG. 3C after application of global optimization.

FIG. 3D schematically illustrates the projected image frames of FIG. 3C after application of global optimization.

Application of rotations 64a and 64b to projected fields of view 60a and 60b forms rotated projected fields of view 70a and 70b, respectively. Projected markings 62a and 62b are rotated to form rotated projected markings 72. Rotated projected markings 72 are aligned with one another in rotated projected fields of view 70a and 70b.

In general, global optimization may include rotation, translation, or both, of project fields of view 60a and 60b. In general, global optimization may include application of six parameters (three describing translation, and three rotation) to each of N camera of the camera network (e.g., N may have a value on the order of 1000, or another number).

Thus, global optimization may entail the equivalent of finding a solution of an equation with 6N unknowns to minimize and an energy function or penalty term that is indicative of mutual alignment of the cameras. For example, the energy function may be indicative of misregistration or misalignment of one or more imaged markings or objects as imaged by different cameras. The misregistration or misalignment may be indicative of differences the calculated position or orientation of an imaged marking or object as measured by different cameras, whether or not the fields of view of the cameras overlap.

For example, gradient descent optimization method or other optimization technique may be applied to the energy function to obtain a globally optimized calibration for each camera after global calibration. As another example, the camera network could be described graphically as a graphical network, in which cameras are represented by nodes and edges between nodes represent constraints between cameras. A belief propagation algorithm, or other algorithm, may be applied to the graph to solve the optimization problem (e.g., minimize the energy function).

The global optimization may enable performance of spatial calibration without acquiring redundant images, as would typically be required with other calibration techniques. As applied in other calibration techniques, many (e.g., more than ten) images would be used, and a calibration would be based on a best fit to the multiple images.

The spatial calibration may be stored for use in analysis of subsequently acquired image frames. For example, when an object is seen moving in a sequence of image frames that are subsequently acquired by camera 12, a position or motion (e.g., speed and direction of motion) of the object may be determined. The spatial calibration may be stored together with data that may be used in applying the calibration, or in determining when recalibration may be required. Such data may include a time of calibration, and one or more conditions (e.g., environmental or other conditions) under which the calibration was performed.

The invention claimed is:

1. A method for automatic spatial calibration of a network of cameras along a road, the method comprising:
    processing a frame that is obtained from each camera of the network to automatically identify an image of a pattern of road markings that have a known spatial relationship to one another;
    using the identified images to calculate a position of each camera relative to the pattern of road markings that is imaged by that camera;
    applying geographical information to calculate an absolute position of a field of view of each camera; and
    applying a global optimization to adjust the absolute position of the field of view of each camera of the camera network relative to the absolute positions of the fields of view of other cameras of the camera network
    wherein applying the global optimization comprises applying a rotation, translation, size adjustment, or shape modification to an absolute position of a field of view of a camera of the camera network, and
    wherein the rotation, translation or size adjustment is configured to align a projection into a horizontal plane of a marking image in the frame that is acquired by one of the cameras with a projection into the horizontal plane of a marking image in the frame that is acquired by a camera of said other cameras.

2. The method of claim 1, wherein identifying the markings comprises applying a Hough transform, a scale invariant feature transform (SIFT), or a speeded up robust features (SURF) detection to the frame.

3. The method of claim 1, wherein the road markings comprise broken line lane separation markings.

4. The method of claim 1, wherein the pattern of road markings is two dimensional.

5. The method of claim 1, wherein using the identified images comprises using a measured position of the identified images within the frame to calculate the position of the camera relative to the pattern.

6. The method of claim 1, wherein the geographical information comprises a known geographical position of the camera.

7. The method of claim 1, wherein the geographical information comprises a known geographical position of the road or of the pattern.

8. The method of claim 1, wherein the field of view is defined relative to a global coordinate system.

9. The method of claim 1, wherein applying the global optimization comprises minimizing a value of a function that is indicative of a misalignment of the field of view of a camera of the camera network relative to the fields of view of the other cameras of the camera network.

10. The method of claim 1, wherein the frame that is obtained from a camera of the camera network is obtained by application of background learning to a plurality of frames that are acquired by that camera.

11. A method according to claim 1, wherein spatial calibration is used for determination of at least one position of an imaged object relative to at least one projected field of view, and thus relative to the known coordinate system, wherein spatial calibration includes determination of a position of a field of view of a camera from among said cameras wherein said position of the field of view includes a position of the field as projected on a predetermined surface and wherein the position of the field of view includes a displacement and orientation of the projection of the field of view with respect to a GPS coordinate system, as determined by a displacement and orientation of the camera and wherein the position of the field of view includes at least one of a size of the projection of the field of view and boundaries of the projected field of view.

12. A camera network system comprising:
a plurality of cameras that are positioned at different places along a road, the road including at least one pattern of road markings; and
a processing unit in communication with a computer readable medium, wherein the computer readable medium contains a set of instructions wherein the processing unit is designed to carry out the set of instructions to: obtain a frame from each camera of said plurality of cameras;
identify in each obtained frame an image of a pattern of said at least one pattern: calculate a position of each camera relative to said pattern of said at least one pattern;
apply geographical information to calculate an absolute position of a field of view of each camera; and apply a global optimization to align the absolute position of the field of view of each camera of said plurality of cameras relative to the absolute position of the fields of view of other cameras of said plurality of cameras
wherein applying the global optimization comprises applying a rotation, translation, size adjustment, or shape modification to an absolute position of a field of view of a camera of the camera network, and
wherein the rotation, translation or size adjustment is configured to align a projection into a horizontal plane of a marking image in the frame that is acquired by one of the cameras with a projection into the horizontal plane of a marking image in the frame that is acquired by a camera of said other cameras.

13. The system of claim 12, wherein said at least one pattern of road markings comprises at least two broken line lane separation markings.

14. The system of claim 12, wherein a geographic position of a camera of said plurality of cameras is known.

15. The system of claim 12, wherein a camera of said plurality of cameras is substantially stationary.

16. The system of claim 12, wherein the instructions to apply the global optimization comprise instructions to minimize a value of a function that is indicative of a misalignment of the field of view of a camera of said plurality of cameras relative to the fields of view of the other cameras of said plurality of cameras.

17. The system of claim 12, wherein the instructions to apply the global optimization comprise instructions to rotate, translate, adjust a size, or modify a shape of an absolute position of a field of view of a camera of said plurality of cameras.

18. The system of claim 12, wherein the absolute position of a field of view is defined relative to a global coordinate system.

19. A system according to claim 12, wherein the cameras include substantially stationary cameras positioned along the road which are spatially calibrated including imaging said at least one pattern of road markings having a known spatial relationship and analyzing the image to determine a position of at least a first camera from among said cameras, relative to the markings and wherein a known geographic position of at least one camera or of said at least one pattern of road markings is utilized to determine an position and orientation of the camera, and a relation of a field of view of the first camera relative to the field of view of another camera from among said cameras.

20. A system according to claim 12, wherein said geographical information is stored in a data storage device as a geographic library which includes information regarding geographic placement of at least one of a road and markings and wherein the information relates to at least one of a shape, direction, or location of at least one of said road and said markings and wherein said geographic library 16 includes an online map resource.

21. a system according to claim 12, wherein said geographical information is stored in a data storage device as a marking library which includes information regarding at least one type of markings including information regarding at least one of relative sizes, absolute sizes, spacing, angles, other spatial relationships among segments of markings and wherein the marking library includes at least one remote resource accessible via Internet.

22. A system according to claim 21, wherein said pattern is defined by pattern points whose coordinates are defined in a local coordinate system defined independently of a location or orientation of the pattern points relative to any landmark or coordinate system and wherein absolute coordinates of the pattern points are defined in a global coordinate system and wherein coordinates of at least one of the road 40, the road markings, the pattern, or the pattern points relative to the global coordinate system are determined by reference to a geographic library including an online map resource.

23. A non-transitory computer readable storage medium having stored thereon instructions that when executed by a processor will cause the processor to perform the method of:
- obtaining a frame from each camera of a network of cameras that are arranged along a road;
- identifying an image of a pattern of road markings in each obtained frame;
- calculating a position of each camera of the network relative to the pattern corresponding to the image in the frame that was obtained from that camera;
- applying geographical information to calculate an absolute position of a field of view of each camera of the network; and
- adjusting the absolute position of the field of view of a camera of the network in relative to the absolute position of the field of view of another camera of the network
- wherein applying the global optimization comprises applying a rotation, translation, size adjustment, or shape modification to an absolute position of a field of view of a camera of the camera network, and
- wherein the rotation, translation or size adjustment is configured to align a projection into a horizontal plane of a marking image in the frame that is acquired by one of the cameras with a projection into the horizontal plane of a marking image in the frame that is acquired by a camera of said other cameras.

24. A product according to claim 23, wherein a geographic position of at least one of the camera, road, road marking, pattern or point is known and is utilized to determine an absolute position of axes of a local coordinate system in a global coordinate system.

* * * * *